US006378302B1

(12) United States Patent
Nozawa et al.

(10) Patent No.: US 6,378,302 B1
(45) Date of Patent: Apr. 30, 2002

(54) HYDRAULIC CIRCUIT SYSTEM

(75) Inventors: Yusaku Nozawa; Mitsuhisa Tougasaki, both of Ibaraki-ken; Yoshizumi Nishimura; Kinya Takahashi, both of Tsuchiura, all of (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 09/674,366

(22) PCT Filed: Apr. 4, 2000

(86) PCT No.: PCT/JP00/02170

§ 371 Date: Oct. 31, 2000

§ 102(e) Date: Oct. 31, 2000

(87) PCT Pub. No.: WO00/65238

PCT Pub. Date: Nov. 2, 2000

(30) Foreign Application Priority Data

Apr. 26, 1999 (JP) .......................................... 11-118644

(51) Int. Cl.[7] .......................... F16D 31/02; F15B 11/08; F15B 13/04

(52) U.S. Cl. .............................. 60/422; 60/452; 91/445

(58) Field of Search .......................... 60/422, 429, 452; 91/445, 446, 447, 448

(56) References Cited

U.S. PATENT DOCUMENTS 5,146,747 A * 9/1992 Sugiyama et al. ............ 60/452
5,209,063 A * 5/1993 Shirai et al. .................. 60/422
5,251,444 A * 10/1993 Ochiai et al. ................. 60/452
5,271,227 A * 12/1993 Akiyama et al. ............ 60/422
5,460,000 A * 10/1995 Kropp ......................... 60/422
5,562,019 A * 10/1996 Kropp ...................... 91/446 X
5,752,384 A * 5/1998 Schmitt et al. ............... 60/426
6,289,675 B1 * 9/2001 Herfs et al. ................... 60/422

FOREIGN PATENT DOCUMENTS

| | | |
|---|---|---|
| JP | 2-213524 | 8/1990 |
| JP | 2721383 | 11/1997 |
| JP | 10-37250 | 2/1998 |
| WO | WO9831940 | 7/1998 |

* cited by examiner

*Primary Examiner*—John E. Ryznic
(74) *Attorney, Agent, or Firm*—Mattingly, Stanger & Malur, P.C.

(57) ABSTRACT

A hydraulic line slit 20 formed in a valve body 50 of a flow distribution valve 5-1, a control chamber 70, and a hydraulic line 31-1 are connected to a signal transmitting hydraulic line 9. A lap portion 32 is formed in the hydraulic line slit 20, the lap portion 32 having a check valve function with a lap amount X when the valve body 50 is in a cutoff position. A 2-position, 3-way valve 11 is disposed in the hydraulic line 31-1. The valve 11 connects the control chamber 70 of the flow distribution valve 5-1 to only the signal transmitting hydraulic line 9 when an external signal F is not applied, and to both the signal transmitting hydraulic line 9 and a lower-pressure detecting hydraulic line 35, which is connected an outlet passage 5*b* of a flow distribution valve 5-2 on the side of a hydraulic actuator 3-2, when the external signal F is applied. With such an arrangement, during a combined operation including driving of an inertial body, a pressure on the lower load pressure side can be detected as a signal pressure without cutting off a load-pressure detecting hydraulic line on the higher load pressure side. Further, a portion for detecting a load pressure is simplified and the flow distributing function is not impaired.

8 Claims, 8 Drawing Sheets

HYDRAULIC CIRCUIT SYSTEM

TECHNICAL FIELD

The present invention relates to a hydraulic circuit system mounted on a construction machine, such as a hydraulic excavator, including a plurality of hydraulic actuators which are often simultaneously operated, and more particularly to a hydraulic circuit system including a load sensing system and having control valves provided with flow distribution valves which enable a combined operation to be performed without being affected by a difference in load pressure between a plurality of hydraulic actuators.

BACKGROUND ART

JP,C 2721383 discloses a hydraulic circuit system employing a load sensing system in a hydraulic excavator as a typical example of construction machines, and including flow distribution valves which enable a combined operation to be performed. The hydraulic circuit system shown in FIG. 3 of the known art comprises a variable displacement hydraulic pump, a tilting control cylinder for the hydraulic pump, an LS valve for operating the tilting control cylinder depending on a differential pressure between a delivery pressure of the hydraulic pump and a maximum load pressure, and a flow distribution valve disposed on the outlet side of each meter-in throttle of a plurality of directional control valves. Further, a branch hydraulic line for detecting a load pressure is provided on the outlet side of each flow distribution valve, and a check valve is provided in the branch hydraulic line. With such an arrangement, when the load pressure of the associated hydraulic actuator is a maximum one, that load pressure is detected by the check valve and the detected load pressure is transmitted, as a signal pressure, to the LS valve via a signal transmitting hydraulic line. Also, a hydraulic fluid outgoing from the meter-in throttle is introduced to the hydraulic actuator through the flow distribution valve. The signal pressure is introduced to a control chamber in which a pressure bearing portion of each flow distribution valve acting in the throttling direction is positioned, and an inlet-side pressure of each flow distribution valve is introduced to a space in which a pressure bearing portion of each flow distribution valve on the opposite side (acting in the valve opening direction) is positioned. Thus, the same signal pressure is applied to the pressure bearing portions of all the flow distribution valves acting in the throttling direction, and the flow distribution valve on the lower load pressure side is balanced when the pressure bearing portion of that valve on the opposite side (acting in the valve opening direction) is subjected to the same pressure as the inlet-side pressure of the flow distribution valve on the higher load pressure side. Accordingly, a differential pressure across the meter-in throttle has the same value on both the higher and lower load pressure sides so that the hydraulic fluid delivered from the hydraulic pump is distributed depending on a ratio between valve openings of the meter-in throttles. With such a flow distributing function, the hydraulic actuators can be operated at the same time regardless of the difference in load pressure.

Also, a swing motor and a boom cylinder are provided as the hydraulic actuators, and an on/off valve is disposed in a branch hydraulic line for detecting a load pressure on the swing motor side. The on/off valve is operated by a pilot pressure signal for the boom-raising operation. With that arrangement, when the boom is raised while turning a swing body of the hydraulic excavator, the on/off valve is operated to cut off the load pressure of the swing motor, and the load pressure of the boom-raising operation is detected, as the signal pressure, to operate the LS valve and a pressure compensation valve.

Further, PCT Laid-Open Publication WO98/31940 discloses a control valve for use in a hydraulic circuit system including a load sensing system, the control valve being constructed as a valve assembly in combination of a flow distribution valve and a hold check valve for simplification. In the disclosed control valve, a valve body of the flow distribution valve is partly incorporated in a hollow valve body of the hold check valve, and a load-pressure detecting hydraulic line of the control valve is formed as an internal passage (hydraulic line slit) of the flow distribution valve. The internal passage is utilized to provide a check valve function. As a result, a check valve as a separate valve element is no longer required and the control valve is simplified in its construction.

DISCLOSURE OF INVENTION

Of civil engineering works using a hydraulic excavator, the most popular one is to scoop earth and sand excavated by a front device and to load the earth and sand on a dump truck. Let suppose the case of carrying out the work in such a manner that the truck is on standby with its bed positioned in a direction rotated 90 degrees from the excavating direction of the front device. After scooping the earth and sand by a bucket, the boom is raised to a level of the truck bed and an upper swing body is turned 90 degrees. Then, the work is finished by discharging the earth and sand onto the truck bed. To perform the work quickly, the upper swing body is turned simultaneously with raising of the boom. To avoid the hydraulic excavator from striking against the truck during the work, the bucket at a fore end of the front device must be at a position higher than the level of the truck bed when the upper swing body has been turned 90 degrees. A method of first turning the upper swing body through 90 degrees and then raising the boom accompanies a possibility that the bucket may strike against the truck bed.

In the hydraulic circuit system having the general construction shown in FIG. 3 of the above-cited JP,C 2721383 with the on/off switch not provided, when remote control valves for swing and boom-raising are both operated at the same time to perform the above-mentioned work, the upper swing body cannot move at once because it is an inertial body and a swing side system has large inertia. Therefore, the pressure detected on the swing side has a value close to a delivery pressure of a hydraulic pump, and the LS valve is operated to increase the pump delivery pressure up to a relief pressure immediately. In spite of that the boom can be operated with a lower pressure than the relief pressure when operated solely, an extra pressure loss (energy loss) is caused in a flow distribution valve portion on the boom side when the boom is operated simultaneously with the upper swing body. If the hydraulic circuit system includes a horsepower control function associated with the hydraulic pump, a pump delivery rate is reduced with an increase in the delivery pressure of the hydraulic pump. Unlike the case of moving an object vertically (i.e., the case where an object cannot be moved by a force less than the weight of the object), a load on the swing side corresponds to the case of moving an object on a horizontal plane. In this case, therefore, the load can be moved by a force greater than a frictional force between the object and the plane. In other words, though slowly accelerated, the upper swing body can be moved with the driving pressure in the boom side. To this end, it is desired that the pressure in the boom side be detected during the combined operation without detecting the pressure in the swing side.

In the hydraulic circuit system shown in FIG. 3 of the above-cited JP,C 2721383, the above-described function is achieved by operating the on/off valve, which is disposed in the branch hydraulic line for detecting the load pressure on the swing side, by the pilot pressure signal for the boom-raising operation so that the load pressure of the swing motor is not detected. The energy consumption and the working speed are thereby improved. In the disclosed prior art, however, it is required to provide a branch hydraulic line dedicated for detecting the load pressure, and to arrange the check valve in the branch hydraulic line. This raises a problem that a portion for detecting the maximum load pressure is complicated and the number of parts is increased, thus resulting in a higher cost.

With the control valve disclosed in the above-cited PCT Laid-Open Publication WO98/31940, as described above, a portion for detecting the load pressure is simplified by forming the load-pressure detecting hydraulic line of the control valve as the internal passage (hydraulic line slit) of the flow distribution valve, and utilizing the internal passage to provide the check valve function. The above-described problem that the portion for detecting the load pressure is complicated can therefore be overcome by employing the disclosed control valve in the hydraulic circuit system shown in FIG. 3 of the above-cited JP,C 2721383. In the case of forming the load-pressure detecting hydraulic line as the internal passage (hydraulic line slit) of the flow distribution valve and utilizing the internal passage to provide the check valve function, however, employing the arrangement of the disclosed hydraulic circuit system, i.e., providing the on/off valve to cut off the load pressure of the swing motor and detecting, as the signal pressure, the load pressure of the boom-raising operation on the lower pressure side during the combined operation of swing and boom-raising, implies not only that the load pressure of the swing motor is cut off (not detected), but also that the signal pressure (load pressure of another actuator) in the signal transmitting hydraulic line cannot be introduced to the control chamber of the flow distribution valve. Thus, the flow distributing function cannot be developed.

A first object of the present invention is to provide a hydraulic circuit system capable of detecting a pressure on the lower load pressure side, as a signal pressure, without cutting off a load-pressure detecting hydraulic line on the higher load pressure side during a combined operation in which an inertial body is driven.

A second object of the present invention is to provide a hydraulic circuit system capable of detecting a pressure on the lower load pressure side, as a signal pressure, during a combined operation in which an inertial body is driven, and capable of simplifying a portion for detecting a load pressure without impairing the flow distributing function.

(1) To achieve the above first and second object, the present invention provides a hydraulic circuit system comprising a hydraulic pump, a plurality of hydraulic actuators driven by a hydraulic fluid delivered from the hydraulic pump, a plurality of control valves disposed between the hydraulic pump and the plurality of actuators, a signal transmitting hydraulic line to which a signal pressure based on a maximum load pressure among the plurality of hydraulic actuators is introduced, and pump control means for controlling a delivery pressure of the hydraulic pump to be held higher than the signal pressure by a predetermined value, the plurality of control valves comprising respectively main valves including meter-in variable throttles for controlling flow rates of the hydraulic fluid supplied to the hydraulic actuators, and flow distribution valves disposed between the meter-in variable throttles and the actuators, each of the flow distribution valves including a valve body which has one end positioned on the inlet side of the flow distribution valve connected to the meter-in variable throttle and the other end positioned in a control chamber, the valve body being moved through a stroke depending on balance between a pressure in the control chamber and a pressure in the inlet side to control the pressure in the inlet side, thereby controlling a differential pressure across the meter-in variable throttle, wherein the hydraulic circuit system further comprises a load-pressure detecting hydraulic line provided in each of the plurality of control valves, the load-pressure detecting hydraulic line including a first hydraulic line with a check valve function, which is branched from a point between the meter-in variable throttle and the hydraulic actuator for detecting a pressure at the branched point, and is connected to the control chamber of the flow distribution valve, and a second hydraulic line for connecting the control chamber to the signal transmitting hydraulic line, the first hydraulic line with the check valve function including a valve body passage, which is formed in a valve body of the flow distribution valve and has one end being opened to one of the inlet side and the outlet side of the flow distribution valve and the other end being opened to an outer periphery of the valve body, and a lap portion located between the other end of the valve body passage and the control chamber and making the other end of the valve body passage opened to the control chamber when the valve body of the flow distribution valve is moved through a stroke of a predetermined distance in the valve opening direction; a selector valve provided in the second hydraulic line of the load-pressure detecting hydraulic line in a first particular control valve of the plurality of control valves; and a third hydraulic line connected to the outlet side of the flow distribution valve in a second particular control valve of the plurality of control valves, the selector valve having a first position at which a portion of the second hydraulic line on the side of the control chamber is connected to only the signal transmitting hydraulic line, and a second position at which the portion of the second hydraulic line on the side of the control chamber is connected to both the signal transmitting hydraulic line and the third hydraulic line.

Thus, the selector valve is disposed in the second hydraulic line of the load-pressure detecting hydraulic line for the first particular control valve, the second hydraulic line connecting the control chamber and the signal transmitting hydraulic line to each other. The selector valve has the second position at which the portion of the second hydraulic line on the side of the control chamber is connected to both the signal transmitting hydraulic line and the third hydraulic line which is connected to the outlet side of the flow distribution valve in the second particular control valve. When the selector valve is shifted to the second position during a combined operation (e.g., combined operation of swing and boom-raising) in which hydraulic actuators associated with the first and control valves are driven simultaneously such that the first particular control valve is on the side driving an inertial body (e.g., the swing side) and the second particular control valve is on the lower load pressure side (e.g., the boom-raising side), the signal transmitting hydraulic line is opened to the outlet side of the flow distribution valve in the second particular control valve as well during the combined operation. Therefore, the pressure in the outlet side of the flow distribution valve in the second particular control valve on the lower load pressure side is detected as the signal pressure by the signal transmitting hydraulic line.

When the pressure on the lower load pressure side is detected by the signal transmitting hydraulic line, the pump control means is operated so as to compensate the detected pressure, and the delivery pressure of the hydraulic pump is controlled to be kept higher than the pressure on the lower load pressure side. Accordingly, the flow distribution valve in the second particular control valve does not develop a throttling operation, and can prevent an extra pressure loss (energy loss) from being produced therein. Further, even when the pump control means includes a horsepower control function, a pump delivery rate is not reduced. As a result, the hydraulic fluid can be supplied to the side of the second particular control valve at a sufficient flow rate and good operability can be obtained in the combined operation.

Also, since the first hydraulic line with the check valve function is constituted as the valve body passage of the flow distribution valve and the valve body passage is utilized to provide the check valve function, a portion for detecting a load pressure of the control valve can be simplified.

In the case of constituting the first hydraulic line with the check valve function by utilizing the valve body passage of the flow distribution valve, cutting off the second hydraulic line, which connects the control chamber to the signal transmitting hydraulic line, implies not only that the pressure in the second hydraulic line is not detected, but also that the signal pressure in the signal transmitting hydraulic line (pressure of another actuator) is not introduced to the control chamber. Thus, the flow distributing function is not developed. With the present invention, the same function as resulted from not detecting the pressure on the side of the first particular control valve (pressure on the higher pressure side) is provided by, rather than cutting off the hydraulic line, connecting the control chamber to both the signal transmitting hydraulic line and the third hydraulic line (outlet side of the flow distribution valve in the second particular control valve). Therefore, a function of introducing the pressure on the side of the second particular control valve (pressure on the lower pressure side; signal pressure) to the control chamber on the side of the first particular control valve is maintained and the flow distributing function is not impaired.

(2) In above (1), preferably, the plurality of control valves further comprise respectively hold check valves disposed between the flow distribution valves and the hydraulic actuators, and the first hydraulic line with the check valve function is branched from a point between the meter-in variable throttle and each of the hold check valves to detect a pressure at the branched point.

With those features, even when the load pressure of the hydraulic actuator is increased beyond the pressure at the meter-in variable throttle of the main valve, the load pressure is held by the hold check valve and the hydraulic fluid is avoided from reversely flowing into a reservoir via the signal transmitting hydraulic line and the signal detecting hydraulic line.

(3) In above (1) or (2), preferably, the plurality of control valves each include a hydraulic line slit formed in the outer periphery of the valve body of the flow distribution valve and opened at one end to the outlet side of the flow distribution valve, the hydraulic line slit constituting the valve body passage.

Those features provide the valve body passage as a part of the first hydraulic line with the check valve function.

(4) In above (1), the hydraulic circuit system further comprises means for producing a first signal when the first and second particular control valves are both operated, and the selector valve is shifted from the first position to the second position by the first signal.

With those features, as mentioned in connection with above (1), the selector valve is operated so as to connect the control chamber to both the signal transmitting hydraulic line and the third hydraulic line, whereupon the pressure in the outlet side of the flow distribution valve in the second particular control valve on the lower load pressure side is detected as the signal pressure by the signal transmitting hydraulic line.

(5) In above (1), the hydraulic circuit system further comprises a check valve disposed in the third hydraulic line and allowing the hydraulic fluid to flow only in a direction toward the flow distribution valve of the second particular control valve from the selector valve.

With those features, when load pressures are reversed in magnitude during the combined operation such that the second particular control valve becomes the side providing a higher load pressure, the higher load pressure is detected as the signal pressure by the signal transmitting hydraulic line. As a result, the hydraulic actuator on the side of the second particular control valve can be positively driven.

(6) In above (5), the check valve is a pilot check valve capable of being selectively opened.

With that feature, when the hydraulic actuator on the side of the second particular control valve reaches its stroke end, the pilot check valve is opened so that the signal pressure in the signal transmitting hydraulic line is given by the pressure on the side of the first particular control valve. This feature contributes to providing a more appropriate working speed and reducing an energy loss.

(7) In above (6), the hydraulic circuit system further comprises means for producing a second signal when the hydraulic actuator associated with the second particular control valve reaches a stroke end, and the pilot check valve is opened by the second signal.

With those features, as mentioned in connection with above (6), when the hydraulic actuator on the side of the second particular control valve reaches its stroke end, the pilot check valve is operated to be open and the signal pressure in the signal transmitting hydraulic line is given by the pressure on the side of the first particular control valve.

(8) Further, to achieve the above object, the present invention provides a hydraulic circuit system comprising a hydraulic pump, a plurality of hydraulic actuators driven by a hydraulic fluid delivered from the hydraulic pump, a plurality of control valves disposed, between the hydraulic pump and the plurality of actuators, a signal transmitting hydraulic line to which a signal pressure based on a maximum load pressure among the plurality of hydraulic actuators is introduced, and pump control means for controlling a delivery pressure of the hydraulic pump to be held higher than the signal pressure by a predetermined value, the plurality of control valves comprising respectively main valves including meter-in variable throttles for controlling flow rates of the hydraulic fluid supplied to the hydraulic actuators, and flow distribution valves disposed between the meter-in variable throttles and the actuators, each of the flow distribution valves including a valve body which has one end positioned on the inlet side of the flow distribution valve connected to the meter-in variable throttle and the other end positioned in a control chamber, the valve body being moved through a stroke depending on balance between a pressure in the control chamber and a pressure in the inlet side to control the pressure in the inlet side, thereby controlling a differential pressure across the meter-in variable throttle, wherein the hydraulic circuit system further comprises a load-pressure detecting hydraulic line provided in each of the plurality of control valves, the load-pressure detecting hydraulic line including a first hydraulic line with a check valve function, which is branched from a point between the meter-in variable throttle and the hydraulic actuator for detecting a pressure at the branched point, and is connected to the control chamber of the flow distribution valve, and a second hydraulic line for connecting the control chamber to the signal transmitting hydraulic line; a selector valve provided in the second hydraulic line of the load-pressure detecting hydraulic line in a first particular control valve of the plurality of control valves; and a third hydraulic line connected to the outlet side of the flow distribution valve in a second particular control valve of the plurality of control valves, the selector valve having a first position at which a portion of the second hydraulic line on the side of the control chamber is connected to only the signal transmitting hydraulic line, and a second position at which the portion of the second hydraulic line on the side of the control chamber is connected to both the signal transmitting hydraulic line and the third hydraulic line.

With those features, as mentioned in connection with above (1), during a combined operation including driving of an inertial body, a pressure on the lower load pressure side can be detected as the signal pressure without cutting off the load-pressure detecting hydraulic line on the higher load pressure side. Therefore, an extra pressure loss (energy loss) can be prevented from being produced in a flow distribution valve portion and good operability can be obtained in the combined operation.

BEST MODE FOR CARRYING OUT THE INVENTION

Embodiments of the present invention will be described below with reference to the drawings.

Initially, a hydraulic circuit system according to a first embodiment of the present invention will be described with reference to FIGS. 1 to 4.

Figure 1:
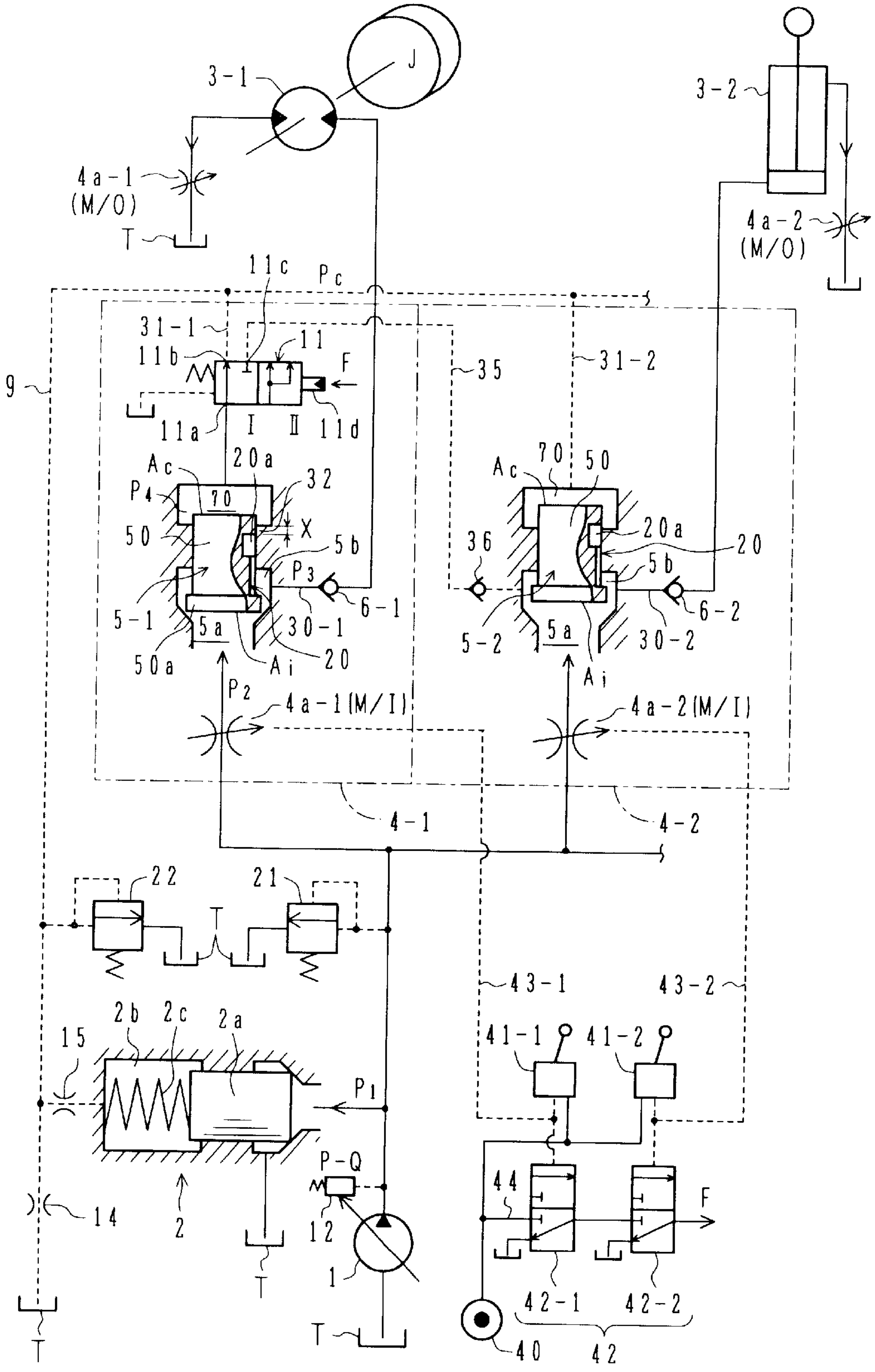
FIG. 1 is a diagram showing a hydraulic circuit system according to a first embodiment of the present invention.

In FIG. 1, the hydraulic circuit system of this embodiment comprises a variable displacement hydraulic pump 1, a horsepower control valve (referred to as a PQ valve hereinafter) 12 for controlling a tilting of the hydraulic pump 1 depending on consumed horsepower, and an LS-control bleed valve 2 for bleeding a hydraulic fluid delivered from the hydraulic pump 1 to a reservoir T depending on a difference between a delivery pressure of the hydraulic pump 1 and a signal pressure Pc (described later) based on a maximum load pressure.

Figure 2:
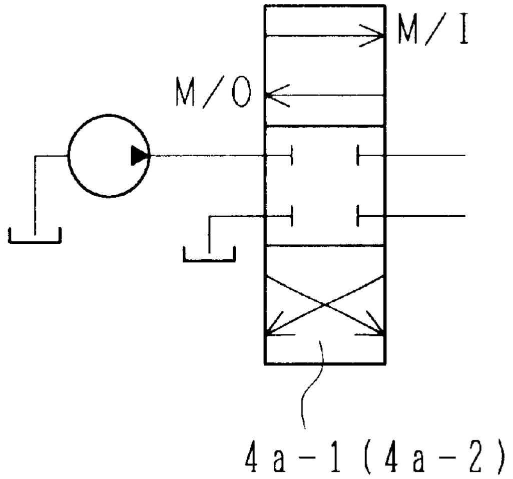
FIG. 2 shows a function of a main valve portion of a control valve using hydraulic symbols.
Figure 3:
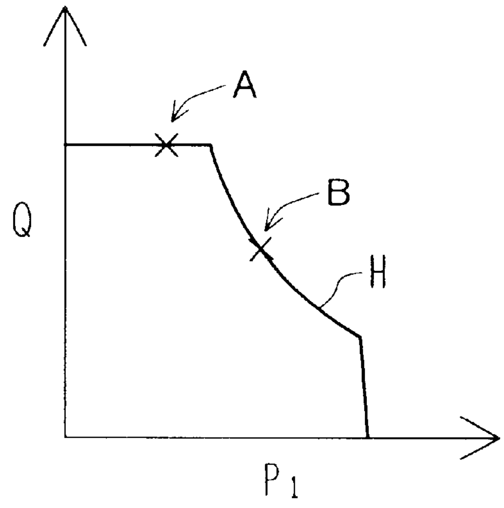
FIG. 3 is a graph showing a characteristic of a PQ valve.

The hydraulic fluid delivered from the hydraulic pump 1 is supplied to a plurality of hydraulic actuators 3-1, 3-2. Between the hydraulic pump 1 and the hydraulic actuators 3-1, 3-2, there are respectively disposed control valves 4-1, 4-2 including spool-type main valves 4*a*-1, 4*a*-2 each of which has a meter-in variable throttle M/I and a meter-out variable throttle M/O as shown in FIG. 2. By operating the main valves 4*a*-1, 4*a*-2 to shift in position, the directions of flow and the flow rates in and by which the hydraulic fluid is supplied to hydraulic actuators 3-1, 3-2 are controlled.

Also, in this embodiment, the hydraulic actuator 3-1 is a hydraulic motor (swing motor) for turning an upper swing body of a hydraulic excavator, and the hydraulic actuator 3-2 is a hydraulic cylinder (boom cylinder) for moving a boom of the hydraulic excavator up and down. While only two actuators are shown in this embodiment, it is a matter of course that the number of actuators usable is not limited to two. For convenience of illustration, FIG. 1 shows the meter-in variable throttle M/I and the meter-out variable throttle M/O, which are only associated with one shift position of each of the main valves 4*a*-1, 4*a*-2, in a manner separated into the meter-in side and the meter-out side. The throttles M/I and M/O of the main valve 4*a*-1 correspond to the shift position for turning the swing body to the right or left, and the throttles M/I and M/O of the main valve 4*a*-2 correspond to the shift position for raising the boom (i.e., for operating the boom cylinder 3-2 in the direction of extension thereof).

In addition to the main valves 4*a*-1, 4*a*-2 each having the meter-in variable throttle M/I and the meter-out variable throttle M/O, the control valves 4-1, 4-2 incorporate therein flow distribution valves 5-1, 5-2 for achieving the combined operation and hold check valves 6-1, 6-2, respectively.

In the control valve 4-1, the flow distribution valve 5-1 and the hold check valve 6-1 are disposed between the meter-in variable throttle M/I and the hydraulic actuator 3-1. The flow distribution valve 5-1 is disposed between the meter-in variable throttle M/I and the hold check valve 6-1.

Further, the flow distribution valve 5-1 has a valve body 50 that is moved through its stroke within a housing to change an opening area between an inlet passage 5*a* and an outlet passage 5*b*. A control chamber 70 is formed behind the valve body 50. The valve body 50 has a valve-opening-direction acting end (pressure bearing sector) positioned in the inlet passage 5*a* and a valve-closing-direction acting end (pressure bearing sector) positioned in the control chamber 70. The valve body 50 is moved through its stroke depending on balance between a pressure in the control chamber 70 and a pressure in the inlet passage 5*a* to make control such that the pressure in the inlet passage 5*a* is kept equal to the pressure in the control chamber 70. A differential pressure across the meter-in variable throttle M/I of the main valve 4*a*-1 is thereby controlled.

Moreover, a hydraulic line slit 20 is formed in an outer periphery of the valve body 50 and is opened to the outlet passage 5*b*. An end portion 20*a* of the hydraulic line slit 20 on the side nearer to the control chamber 70 is not opened to an end of the valve body 50 so that, when the valve body 50 is in the closed position as shown, a lap portion 32 having a lap amount X is formed between the hydraulic line slit 20 and the control chamber 70 to cut off communication therebetween. When the valve body 50 is moved through its stroke from the shown closed position in excess of the lap amount X, the hydraulic line slit 20 is opened to the control chamber 70. In other words, the lap portion 32 functions as a dead zone in the operation of the valve body 50. The control chamber 70 is connected to a signal transmitting hydraulic line 9 through a hydraulic line 31-1, and a 2-position, 3-way valve 11, which is a feature of the present invention, is disposed in the hydraulic line 31-1.

In the above arrangement, the hydraulic line slit 20 and the lap portion 32 constitute a first hydraulic line with a check valve function, which is branched from a point between the meter-in variable throttle M/I and the hydraulic actuator 3-1 and detects a pressure at the branched point, and which is connected to the control chamber 70 of the flow distribution valve 5-1. The hydraulic line 31-1 constitutes a second hydraulic line for connecting the control chamber 70 to the signal transmitting hydraulic line 9. Also, in this embodiment including the hold check valves 6-1 and 6-2, the first hydraulic line with the check valve function (i.e., the hydraulic line slit 20 and the lap portion 32) is branched from a point between the meter-in variable throttle M/I and the hold check valve 6-1, more precisely, between the flow distribution valve 5-1 and the hold check valve 6-1, and detects a pressure at the branched point. Further, when the 2-position, 3-way valve 11 is in a position I (described later), the lap portion 32 effects a check valve function for allowing the load pressure to be detected only when the load pressure of the associated hydraulic actuator 3-1 is a maximum one (as described later).

A larger diameter portion 50*a* is formed at an end of the valve body 50 of the flow distribution valve 5-1 on the side of the inlet passage 5*a* so that a pressure bearing area Ai of the valve body 50 on the side of the inlet passage 5*a* and a pressure bearing area Ac thereof on the side of the control chamber 70 satisfies a relationship of Ai>Ac. This arrangement reduces the influence of a flow force acting upon the valve body 50.

The control valve 4-2 on the side of the hydraulic actuator 3-2 includes the flow distribution valve 5-2 that is constructed similarly to the above-described flow distribution valve 5-1 of the control valve 4-1. In FIG. 1, identical components of the control valve 4-2 to those of the control valve 4-1 are denoted by the same main numerals added with the sub-numeral 2 in place of 1 and a description thereof is omitted here. However, a 2-position, 3-way valve is not disposed in a hydraulic line 31-2. In addition, a lower-pressure detecting hydraulic line 35 is connected, as a third hydraulic line, to an outlet passage 5*b* of the flow distribution valve 5-2 of the control valve 4-2, and a check valve 36 is disposed in the lower-pressure detecting hydraulic line 35. The check valve 36 blocks off a flow of the hydraulic fluid from the side of the flow distribution valve 5-2 when the load pressure of the hydraulic actuator 3-2 is higher than the load pressure of the hydraulic actuator 3-1.

The 2-position, 3-way valve 11 disposed in the control valve 4-1 on the side of the hydraulic actuator 3-1 has one inlet port 11*a* and two outlet ports 11*b*, 11*c*. The inlet port 11*a* is connected to a portion of the hydraulic line 31-1 on the side nearer to the control chamber 70. One outlet port 11*b* is connected to the signal transmitting hydraulic line 9, and the other outlet port 11*c* is connected to the outlet passage 5*b* of the flow distribution valve of the control valve 4-2 on the side of the hydraulic actuator 3-2 via the lower-pressure detecting hydraulic line 35.

Furthermore, the 2-position, 3-way valve 11 has a hydraulically operating sector lid to which a hydraulic signal is introduced as an external signal F. When the external signal F is not applied, the 2-position, 3-way valve 11 is in a position I, and when the external signal F is applied to the hydraulically operating sector 11*d*, the 2-position, 3-way valve 11 is shifted to a position II. When the 2-position, 3-way valve 11 is in the position I, the inlet port 11*a* is connected to the outlet port 11*b* only, causing the control chamber 70 of the flow distribution valve 5-1 to be connected to only the signal transmitting hydraulic line 9. When the 2-position, 3-way valve 11 is in the position II, the inlet port 11*a* is connected to both the outlet ports 11*b* and 11*c*, causing the control chamber 70 to be connected to both the signal transmitting hydraulic line 9 and the lower-pressure detecting hydraulic line 35.

The main valves 4*a*-1, 4*a*-2 of the control valves 4-1, 4-2 are operated respectively by remote control valves 41-1, 41-2, and the external signal F is produced using output pressures of the remote control valves 41-1, 41-2. More specifically, the remote control valves 41-1, 41-2 produce pilot pressures depending on amounts, by which those valves are operated, by utilizing a pressure of a pilot hydraulic fluid source 40 as a source pressure. The pilot pressure produced by the remote control valve 41-1 is introduced to the throttles M/I and M/O of the main valve 4*a*-1 via a pilot hydraulic line 43-1, and the pilot pressure produced by the remote control valve 41-2 is introduced to the throttles M/I and M/O of the main valve 4*a*-2 via a pilot hydraulic line 43-2. The pilot pressure in the pilot hydraulic line 43-1 is used in turning the upper swing body to the right or left, and the pilot pressure in the pilot hydraulic line 43-2 is used in raising the boom.

An AND circuit 42 comprising a valve group of selector valves 42-1, 42-2 are disposed in a branch hydraulic line 44 branched from the hydraulic fluid source 40. Operating sectors of the selector valves 42-1, 42-2 are connected respectively to the pilot hydraulic lines 43-1, 43-2. When both the remote control valves 41-1, 41-2 are operated and the pilot pressures are produced in both the pilot hydraulic lines 43-1, 43-2, the selector valves 42-1, 42-2 are both shifted from the positions shown, whereby the pressure of the pilot hydraulic fluid source 40 is outputted as the external signal F.

The PQ valve 12 functions to control a tilting of the hydraulic pump 1 so that the product (horsepower) of a delivery pressure P1 of the hydraulic pump 1 and a delivery rate Q of the hydraulic pump 1 is held constant. With the provision of the PQ valve 12, as indicated by a curve H in FIG. 3, the delivery rate Q of the hydraulic pump 1 is controlled so as to reduce with an increase in the delivery pressure P1 of the hydraulic pump 1.

The bleed valve 2 comprises a valve body 2*a*, a spring chamber 2*b* in which a valve-closing-direction acting end of the valve body 2*a* is positioned, and a spring 2*c* disposed in the spring chamber 2*b* for biasing the valve body 2*a* in the valve closing direction. The spring chamber 2*b* is connected to the signal transmitting hydraulic line 9 through a throttle 15 for introducing the signal pressure detected in the signal transmitting hydraulic line 9 to the spring chamber 2*b*. Assuming that the delivery pressure of the hydraulic pump 1 is P1 and the signal pressure in the signal transmitting hydraulic line 9 is Pc, the bleed valve 2 functions such that, when a difference between P1 and Pc exceeds a differential pressure ΔPL set by the spring 2*c*, an extra flow from the hydraulic pump 1 is returned to the reservoir T. This implies that the extra flow is returned to the reservoir T when a differential pressure created depending on the flow rate of the hydraulic fluid passing each of the control valves 4-1, 4-2, i.e., a differential pressure between the inlet pressure (=P1) of the meter-in variable throttle M/I and the signal pressure Pc in the signal transmitting hydraulic line 9, exceeds ΔPL.

Numeral 21 denotes a main relief valve for protecting the main circuit, and 22 denotes an auxiliary relief valve for protecting the signal circuit.

Figure 4:
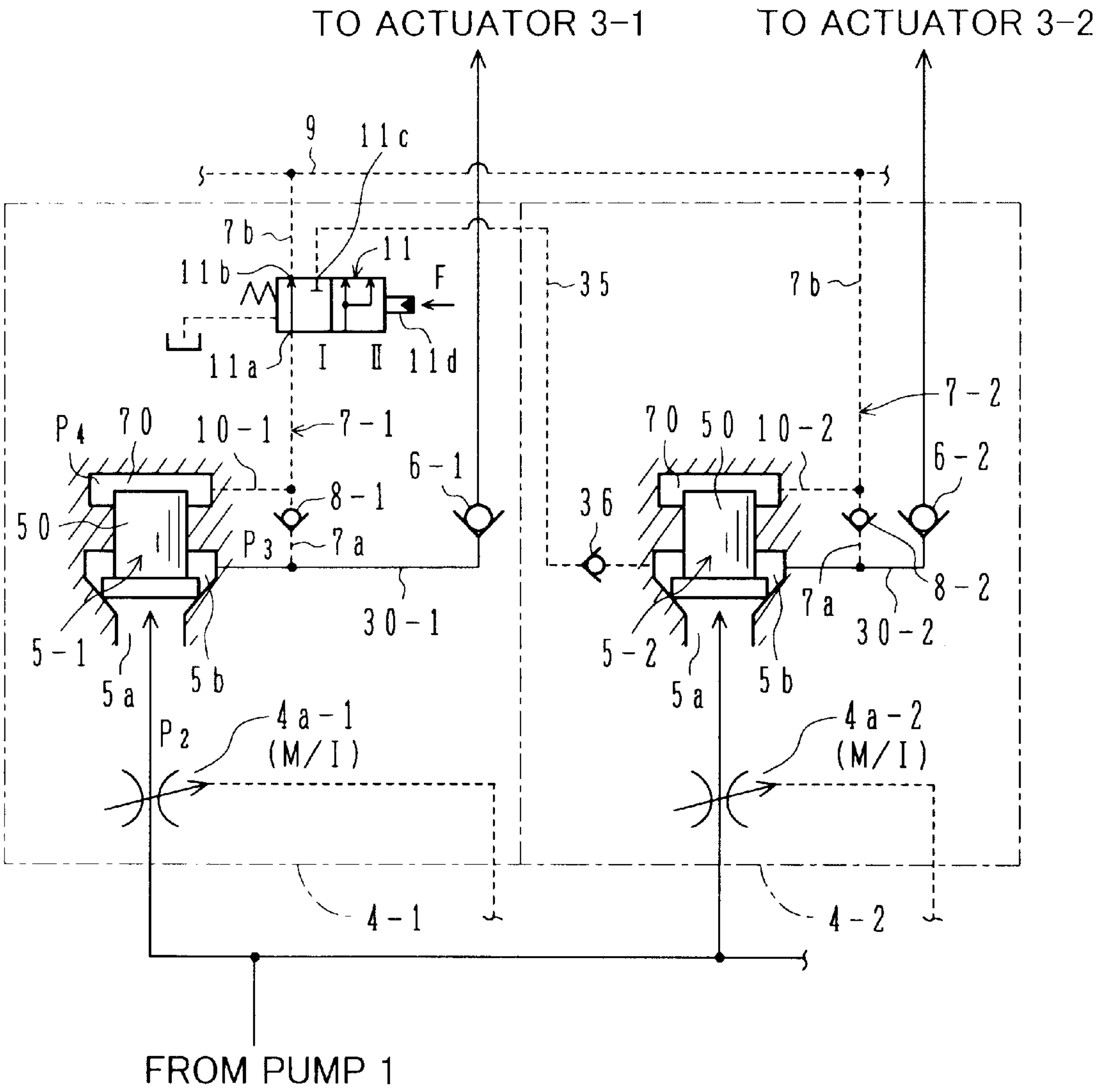
FIG. 4 is a diagram showing an equivalent circuit for explaining a function of the control valve shown in FIG. 1.

FIG. 4 shows an equivalent circuit for explaining the load-pressure detecting function of the control valves 4-1, 4-2.

In FIG. 4, a load-pressure detecting hydraulic line 7-1 is branched from a hydraulic line 30-1 between the outlet passage 5*b* of the flow distribution valve 5-1 and the hold check valve 6-1 in the control valve 4-1, and is connected to the signal transmitting hydraulic line 9. Also, a control hydraulic line 10-1 is branched from the load-pressure detecting hydraulic line 7-1 and connected to the control chamber 70. A check valve 8-1 allowing the hydraulic fluid to flow only in a direction toward the signal transmitting hydraulic line 9 from the hydraulic line 30-1 is provided in a hydraulic line portion 7*a* of the load-pressure detecting hydraulic line 7-1 between a branched point from the hydraulic line 30-1 and a branched point to the control hydraulic line 10-1. The 2-position, 3-way valve 11 is disposed in a hydraulic line portion 7*b* of the load-pressure detecting hydraulic line 7-1 between the branched point to the control hydraulic line 10-1 and the signal transmitting hydraulic line 9.

In the control valve 4-1 shown in FIG. 1, the hydraulic line slit 20 corresponds to the hydraulic line portion 7*a* of the load-pressure detecting hydraulic line 7-1, the hydraulic line 31-1 corresponds to the hydraulic line portion 7*b* of the load-pressure detecting hydraulic line 7-1, and the lap portion 32 corresponds to the check valve 8-1 and the control hydraulic line 10-1. Thus, in the case of the 2-position, 3-way valve 11 being in the position I (described later), when the load pressure of the associated hydraulic actuator 3-1 is a maximum one (as described later), that load pressure is introduced to the control chamber 70 from a portion between the flow distribution valve 5-1 and the hold check valve 6-1 through the hydraulic line slit 20 (the hydraulic line portion 7*a* in FIG. 4). The load pressure introduced to the control chamber 70 is further introduced to the signal transmitting hydraulic line 9 through the hydraulic line 31-1 (the hydraulic line portion 7*b* in FIG. 4).

The load-pressure detecting function on the side of the control valve 4-2 is essentially the same as that of the control valve 4-1 except for that a 2-position, 3-way valve is not provided.

In the control valves 4-1, 4-2 of this embodiment, as described above, the load-pressure detecting hydraulic lines each provided with the check valve function are incorporated as respective internal passages of the flow distribution valves 5-1, 5-2.

Figure 5:
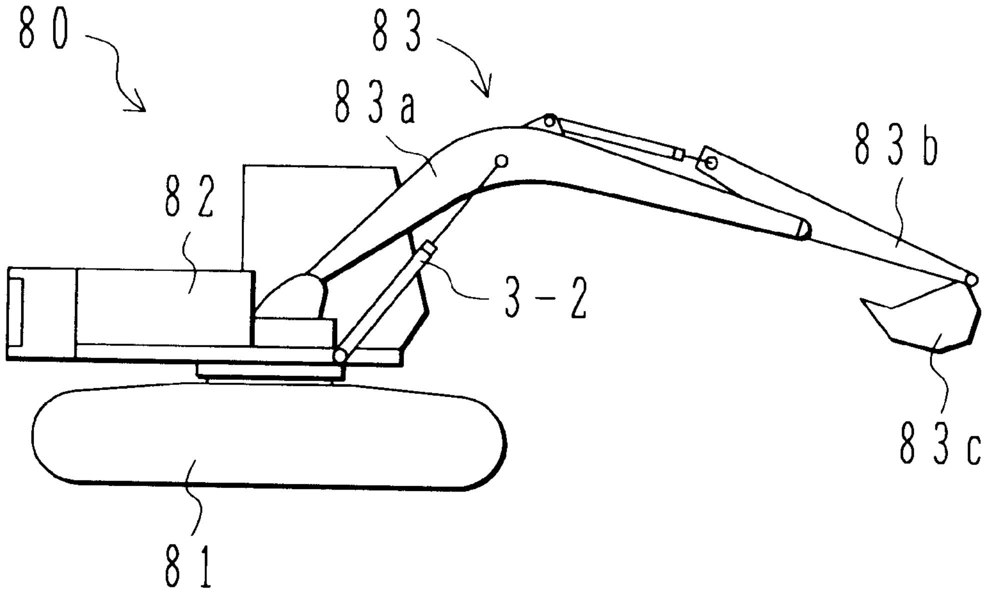
FIG. 5 shows an appearance of a hydraulic excavator in which the hydraulic circuit system of the present invention is equipped.

FIG. 5 shows an appearance of a hydraulic excavator in which the hydraulic circuit system of this embodiment is equipped.

In FIG. 5, numeral 80 denotes a hydraulic excavator. The hydraulic excavator 80 comprises a lower track structure 81, an upper swing body 82 turning on the lower track structure 81, and a front device 83 provided on the upper swing body 82. The front device 83 comprises a boom 83*a* mounted to the upper swing body 82 to be able to move in the vertical direction, an arm 83*b* coupled to a fore end of the boom 83*a* to be able to move in the vertical and back-to-forth directions, and a bucket 83c coupled to a fore end of the arm 83*b* to be able to move in the vertical and back-to-forth directions. The upper swing body 82 is driven for swing by the hydraulic actuator (swing motor) 3-1 shown in FIG. 1, and the boom 83*a* is driven for rotating in the vertical direction by the hydraulic actuator (boom cylinder) 3-2.

The operation of the hydraulic circuit system of this embodiment, which is equipped in the hydraulic excavator thus constructed, will be described below.

A description is first made of the sole operation of the hydraulic actuator (swing motor) 3-1.

In the sole operation of the hydraulic actuator 3-1, only the remote control valve 41-1 is operated and the external signal F is not applied to the 2-position, 3-way valve 11. Therefore, the 2-position, 3-way valve 11 is in the position I. Upon an operation of the remote control valve 41-1, the meter-in variable throttle M/I of the main valve 4-1 is opened and the hydraulic fluid delivered from the hydraulic pump 1 is supplied to the hydraulic actuator 3-1 via the meter-in variable throttle M/I and the flow distribution valve 5-1. At this time, the valve body 50 of the flow distribution valve 5-1 is opened by being moved upward as viewed in the drawing, causing the hydraulic line slit 20 to be opened to the control chamber 70. Therefore, the load pressure of the hydraulic actuator 3-1 is detected by the hydraulic line slit 20, the control chamber 70 and the hydraulic line 30-1 (the load-pressure detecting hydraulic line 7-1 in FIG. 4). The detected load pressure is introduced, as the signal pressure Pc, to the signal transmitting hydraulic line 9. The signal pressure Pc is then introduced to the spring chamber 2*b* of the bleed valve 2, which controls the delivery pressure P1 of the hydraulic pump 1 so as to be kept higher than the signal pressure Pc by the setting value ΔPL of the spring 2*c*.

Assuming now that the pressure in the inlet passage 5*a* (also referred to as the inlet pressure hereinafter) of the flow distribution valve 5-1 is P2, the pressure in the outlet passage 5*b* (also referred to as the outlet pressure hereinafter) thereof is P3, and the pressure in the control chamber 70 (also referred to as the control pressure hereinafter) is P4, a pressure loss caused in the hold check valve 6-1 is very small and the outlet pressure P3 of the flow distribution valve 5-1 is almost equal to the load pressure of the hydraulic actuator 3-1.

Next, a description is made of the combined operation of the hydraulic actuator (swing motor) 3-1 and the hydraulic actuator (boom cylinder) 3-2, during which both the remote control valves 41-1, 41-2 are operated at the same time.

Upon both the remote control valves 41-1, 41-2 being operated at the same time, the AND circuit 42 comprising the selector valves 42-1, 42-2 outputs the external signal F, and the 2-position, 3-way valve 11 is shifted to the position II by the external signal F. When the 2-position, 3-way valve 11 is in the position II, the control chamber 70 is connected, as described above, to both the signal transmitting hydraulic line 9 and the lower-pressure detecting hydraulic line 35, that is to say, to the output passage of the flow distribution valve 5-2 on the side of the hydraulic actuator 3-2 as well.

Also, as described above, the hydraulic actuator 3-1 is the hydraulic motor (swing motor) for turning the upper swing body 82 of the hydraulic excavator, and the hydraulic actuator 3-2 is the hydraulic cylinder (boom cylinder) for moving the boom 83*a* of the hydraulic excavator in the vertical direction. The pilot pressure outputted to the pilot hydraulic line 43-1 from the remote control valve 41-1 is used to turn the upper swing body to the right or left, and the pilot pressure outputted to the pilot hydraulic line 43-2 from the remote control valve 41-2 is used to raise the boom.

Accordingly, the above-mentioned combined operation is implemented as an operation of turning the upper swing body and raising the boom simultaneously. At the startup of the combined operation, the load pressure of the hydraulic actuator 3-1 (swing motor) is higher than the load pressure of the hydraulic actuator 3-2 (boom cylinder), thus resulting in that the hydraulic actuator 3-1 is on the higher load pressure side and the hydraulic actuator 3-2 is on the lower load pressure side.

Let suppose the case where, in the combined operation of swing and boom-raising, if the 2-position, 3-way valve 11 is not provided in the hydraulic line 31-1 (the hydraulic line portion 7*b* of the load-pressure detecting hydraulic line 7-1 in FIG. 4) (or if the valve 11 is in the position I). Since the upper swing body 82 driven by the hydraulic actuator 3-1 has large inertia and moves slowly, the flow rate of the hydraulic fluid passing through the meter-in variable throttle M/I of the main valve 4*a*-1 is small and the delivery pressure P1 of the hydraulic pump 1 is not so different from the inlet pressure P2 of the flow distribution valve 5-1. Accordingly, the outlet pressure P3 of the flow distribution valve 5-1 is almost equal to the inlet pressure P2 thereof and is detected as the signal pressure Pc in the signal transmitting hydraulic line 9. A value close to the inlet pressure P2 is detected as the signal pressure Pc under the condition that the flow rate is small and the signal transmitting hydraulic line 9 is closed by a throttle 14. Once the pressure on the side of the hydraulic actuator 3-1 is detected, the bleed valve 2 is operated so as to compensate the detected pressure, and the delivery pressure of the hydraulic pump 1 rises up to the relief pressure of the relief valve 32 at once. In spite of that the hydraulic actuator 3-2 (boom cylinder) on the lower load pressure side can be operated with a lower pressure than the relief pressure, therefore, the flow distribution valve 5-2 develops a throttling operation because of the pump delivery pressure PI being increased to a high level, and hence produces an extra pressure loss therein. Also, with the pump delivery pressure P1 increased to a high level, the PQ valve 12 having the characteristic shown in FIG. 3 controls the hydraulic pump 1 to shift from an operating point (A) to an operating point (B) in FIG. 3, whereby the delivery rate Q of the hydraulic pump 1 is reduced. As a result, in the work of loading excavated earth and sand on a dump truck by the combined operation of swing and boom-raising, the amount by which the boom is raised becomes insufficient such that, when the upper swing body 82 has been turned 90 degrees, the bucket 83 at the fore end of the front device 83 cannot be raised up to a position higher than the level of a truck bed.

In this embodiment, the 2-position, 3-way valve 11 is provided in the hydraulic line 31-1 (the hydraulic line portion 7*b* of the load-pressure detecting hydraulic line 7-1 in FIG. 4), and the 2-position, 3-way valve 11 is shifted to the position II during the combined operation of swing and boom-raising so that the control chamber 70 is connected to both the signal transmitting hydraulic line 9 and the lower-pressure detecting hydraulic line 35. Therefore, the signal transmitting hydraulic line 9 is also opened to the outlet passage 5*b* of the flow distribution valve 5-2 on the side of the hydraulic actuator 3-2 via the lower-pressure detecting hydraulic line 35 and the check valve 36, whereby the load pressure of the hydraulic actuator 3-2 on the lower load pressure side is detected, as the signal pressure Pc, by the signal transmitting hydraulic line 9. When the load pressure on the side of the hydraulic actuator 3-2 is detected, the bleed valve 2 is operated so as to compensate the detected pressure, and the delivery pressure P1 of the hydraulic pump 1 is controlled to be kept higher than the load pressure of the hydraulic actuator 3-2 by the setting value ΔPL. Accordingly, the flow distribution valve 5-2 does not develop a throttling operation, and can prevent an extra pressure loss from being produced therein. Further, since a reduction in the pump delivery rate due to the action of the PQ valve 12 is suppressed, the hydraulic fluid can be supplied to the hydraulic actuator 3-2 at a required flow rate and the boom 83*a* can be raised in sufficient amount.

Unlike the case of moving the boom 83*a* vertically by the boom cylinder 3-2 (i.e., the case where an object cannot be moved by a force less than the weight of the object), driving the upper swing body 82, which is a load of the swing motor 3-1, corresponds to the case of moving an object on a horizontal plane. In this case, therefore, the upper swing body 82 can be moved by a force greater than a frictional force produced by the upper swing body 82. In other words, though slowly accelerated, the swing motor 3-1 can be moved with the driving pressure on the side of the boom cylinder 3-1. Thus, while the delivery pressure P1 of the hydraulic pump 1 is controlled to be kept higher than the load pressure of the hydraulic actuator 3-2 by the setting value ΔPL, the hydraulic actuator 3-1 can turn the upper swing body 82 sufficiently with the pump delivery pressure so controlled.

After the startup, when the upper swing body 82 shifts to a steady state following an acceleration stage for swing, the load pressure of the hydraulic actuator 3-1 is reduced, and therefore the driving pressure of the hydraulic actuator 3-1 may be reduced midway before the hydraulic actuator 3-2 reaches its stroke end. In such an event, if the check valve 36 is not provided in the lower-pressure detecting hydraulic line 35, there would occur a risk that the load pressure of the hydraulic actuator 3-1 is detected as the signal pressure Pc by the signal transmitting hydraulic line 9 and the hydraulic actuator 3-2 cannot be driven any more. In this embodiment, since the check valve 36 is provided in the lower-pressure detecting hydraulic line 35, the load pressure of the hydraulic actuator 3-1 is never detected as the signal pressure Pc by the signal transmitting hydraulic line 9 and the hydraulic actuator 3-2 can be positively driven.

With this embodiment, as described above, during the combined operation of swing and boom-raising, the load pressure of the hydraulic actuator 3-2 on the lower load pressure side is detected as the signal pressure, and the delivery pressure of the hydraulic pump 1 is controlled by the bleed valve 2 for driving the swing motor 3-1 and the boom cylinder 3-2. It is therefore possible to prevent an extra pressure loss from being produced in the flow distribution valve 5-2 on the side of the boom cylinder 3-2, and to reduce an energy loss. Further, the boom 83*a* can be raised sufficiently and the operability is improved when the upper swing body is turned and the boom is raised at the same time.

Also, during the combined operation of swing and boom-raising, when the load pressures of the swing motor 3-1 and the boom cylinder 3-2 are reversed in magnitude such that the boom cylinder 3-2 becomes the side providing a higher load pressure, the higher load pressure of the boom cylinder 3-2 is detected as the signal pressure by the signal transmitting hydraulic line 9. Accordingly, the boom cylinder 3-2 can be positively driven.

Further, with this embodiment, the load-pressure detecting hydraulic line of each control valve 4-1, 4-2 is formed as the internal passage (the hydraulic line slit 20) of the flow distribution valve 5-1, 5-2, and the internal passage is utilized to provide the check valve function. Therefore, a dedicated hydraulic line and valve element in the form of a check valve are no longer required, and the load-pressure detecting function can be realized with a simplified structure.

The swing load pressure can be cut off by providing an on/off valve in the hydraulic line 31-1 of the control valve 4-1 (the hydraulic line portion 7*b* of the load-pressure detecting hydraulic line 7-1 in FIG. 4) and closing the on/off valve during the combined operation. In this case, however, the signal pressure (the load pressure of the boom cylinder 3-2) in the signal transmitting hydraulic line 9 cannot be introduced to the control chamber 70 and the flow distributing function fails to develop. By contrast, in this embodiment, the 2-position, 3-way valve 11 is provided in the hydraulic line 31-1 to provide the function of detecting the lower load pressure. As a result, the function of introducing the signal pressure in the signal transmitting hydraulic line 9 to the control chamber 70 is maintained and the flow distributing function is not impaired.

Moreover, the hydraulic line with the check valve function (the hydraulic line portion 7*a* of each load-pressure detecting hydraulic line 7-1, 7-2 including the check valve 8-1, 8-2), which is constituted by the hydraulic line slit 20 and the lap portion 32, is branched from the hydraulic line 30-1, 30-2 between the flow distribution valve 5-1, 5-2 and the hold check valve 6-1, 6-2 and detects a pressure in the hydraulic line 30-1, 30-2 as the load pressure. Therefore, even when the load pressure of each hydraulic actuator 3-1, 3-2 is increased beyond the pressure at the meter-in variable throttle M/I of the main valve 4*a*-1, 4*a*-2, the load pressure is held by the hold check valve 6-1, 6-2 and the hydraulic fluid is avoided from reversely flowing into the reservoir T via the load-pressure detecting hydraulic line 7-1, 7-2, the signal transmitting hydraulic line 9 and the throttle 14.

A second embodiment of the present invention will be described with reference to FIG. 6. The present invention is intended to improve the operation when the boom cylinder reaches its stroke end.

Figure 6:
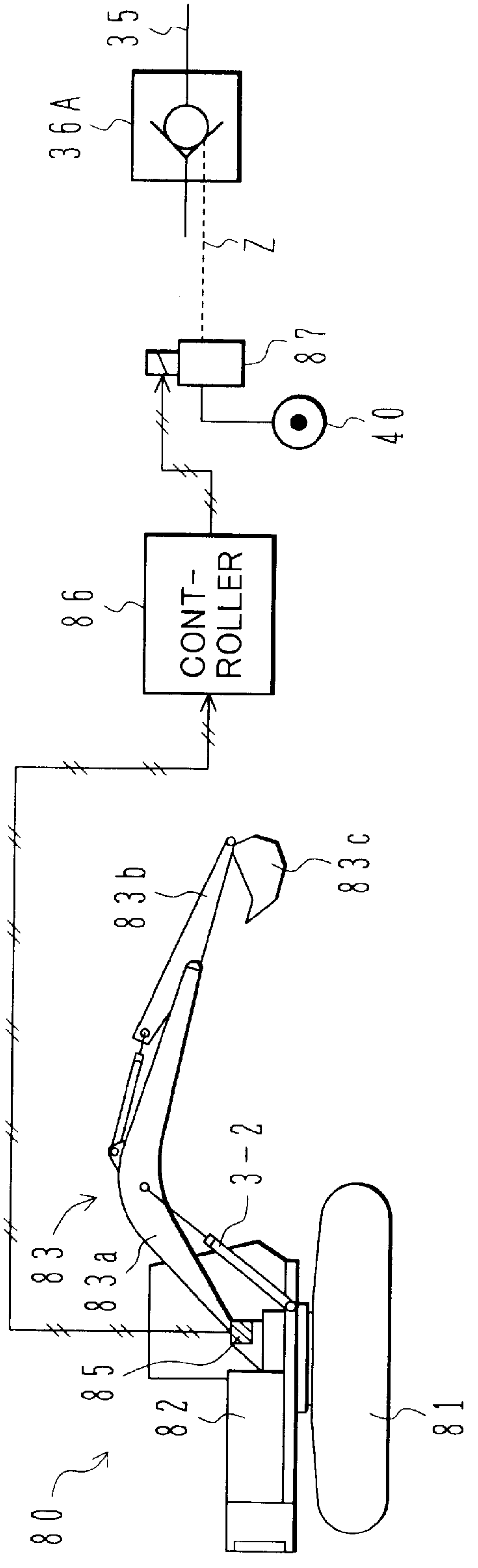
FIG. 6 is a diagram showing principal part of a hydraulic circuit system according to a second embodiment of the present invention.

In FIG. 6, an angle sensor 85 for detecting an angle of rotation of the boom 83*a* is provided at a base end serving as a fulcrum about which the boom 83*a* rotates, and a detection signal from the angle sensor 85 is inputted to a controller 86. Based on the detection signal from the angle sensor 85, the controller 86 determines whether the hydraulic actuator 3-2 has reached the stroke end. If it is determined that the hydraulic actuator 3-2 has reached the stroke end, the controller 86 outputs an electrical signal to a solenoid selector valve 87. When the electrical signal is applied, the solenoid selector valve 87 is shifted to an open position, whereupon the pilot pressure of the pilot hydraulic source 40 is outputted as an external signal Z to a pilot check valve 36A.

The pilot check valve 36A is provided, for example, in place of the check valve 36 shown in FIG. 1, and is operated so as to open upon the external signal Z (pilot pressure) being applied from the solenoid selector valve 87.

In the work of loading excavated earth and sand on a dump truck by the combined operation of swing and boom-raising, when the angle of swing of the front device 83 from the position of excavation to a truck bed is large and the front device 83 must be turned 180 degrees, for example, the hydraulic actuator 3-2 reaches the stroke end midway the swing. In such a case, if the check valve 36 is provided in the lower-pressure detecting hydraulic line 35, the load pressure of the hydraulic actuator 3-2 having reached the stroke end is detected and a pressure set for the relief valve 22 disposed in the signal transmitting hydraulic line 9 becomes the signal pressure Pc. In that case, however, the hydraulic actuator 3-2 has already reached the stroke end and no longer requires the hydraulic fluid. It is just required to supply the hydraulic fluid to the hydraulic actuator 3-1 only.

In this embodiment, when the angle sensor 86 and the controller 86 detect a condition that the hydraulic actuator 3-2 is in the vicinity of the stroke end, the solenoid selector valve 87 applies the pilot pressure, as the external signal Z, to the pilot check valve 36A to open it, whereby the pressure in the signal transmitting hydraulic line 9 is given by the pressure on the side of the hydraulic actuator 3-1. Thus, this embodiment contributes to providing a more appropriate working speed and reducing an energy loss.

While the operation is continued using the load pressure on the side of the hydraulic actuator 3-1, the position of the hydraulic actuator 3-2 (boom position) is held by the hold check valve 6-2.

Incidentally, the stroke end of the hydraulic actuator 3-2 may also be detected by, rather than the angle sensor, a stroke sensor or a pressure sensor for detecting the load pressure of the hydraulic actuator 3-2.

Figure 7:
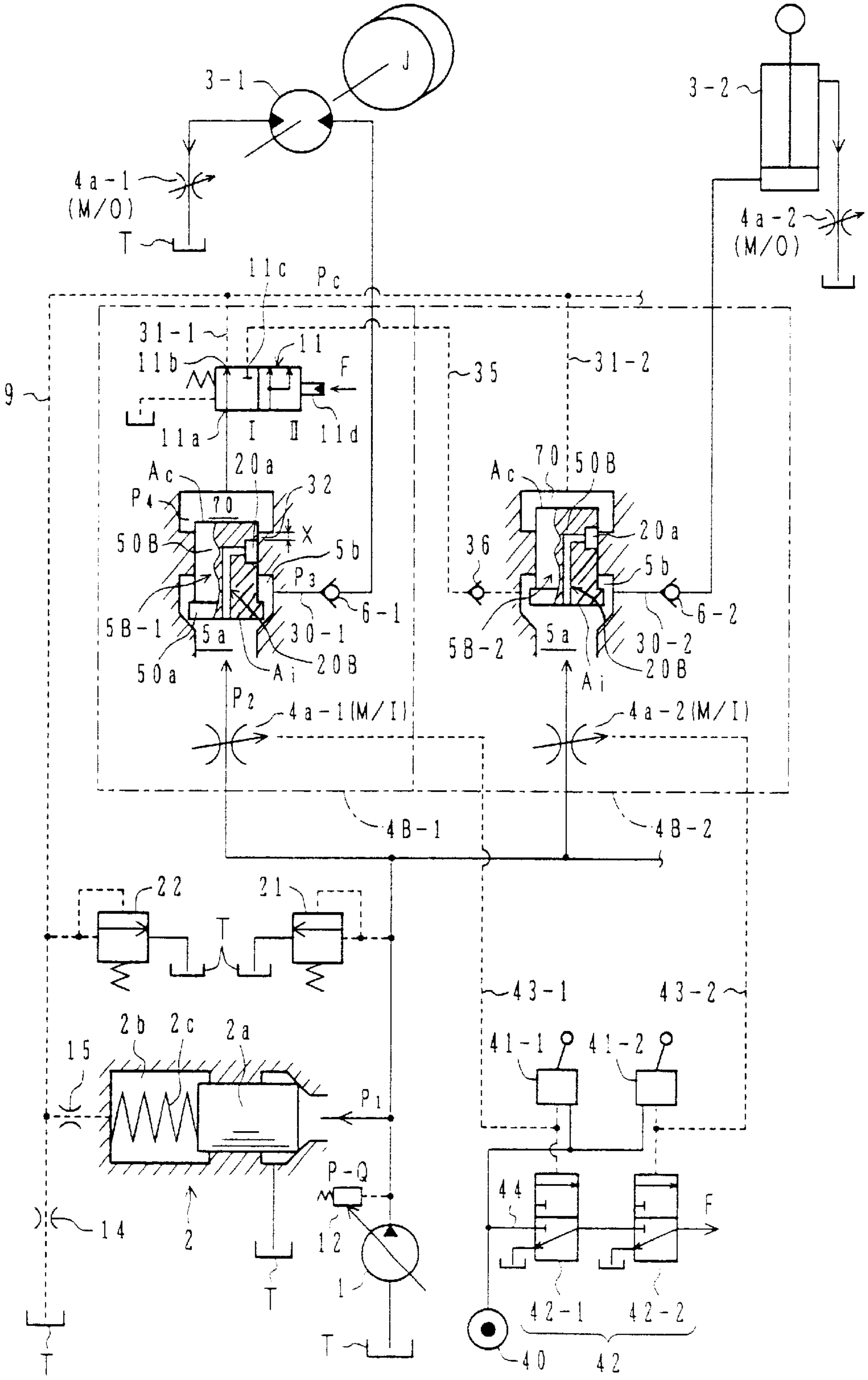
FIG. 7 is a diagram showing a hydraulic circuit system according to a third embodiment of the present invention.
Figure 8:
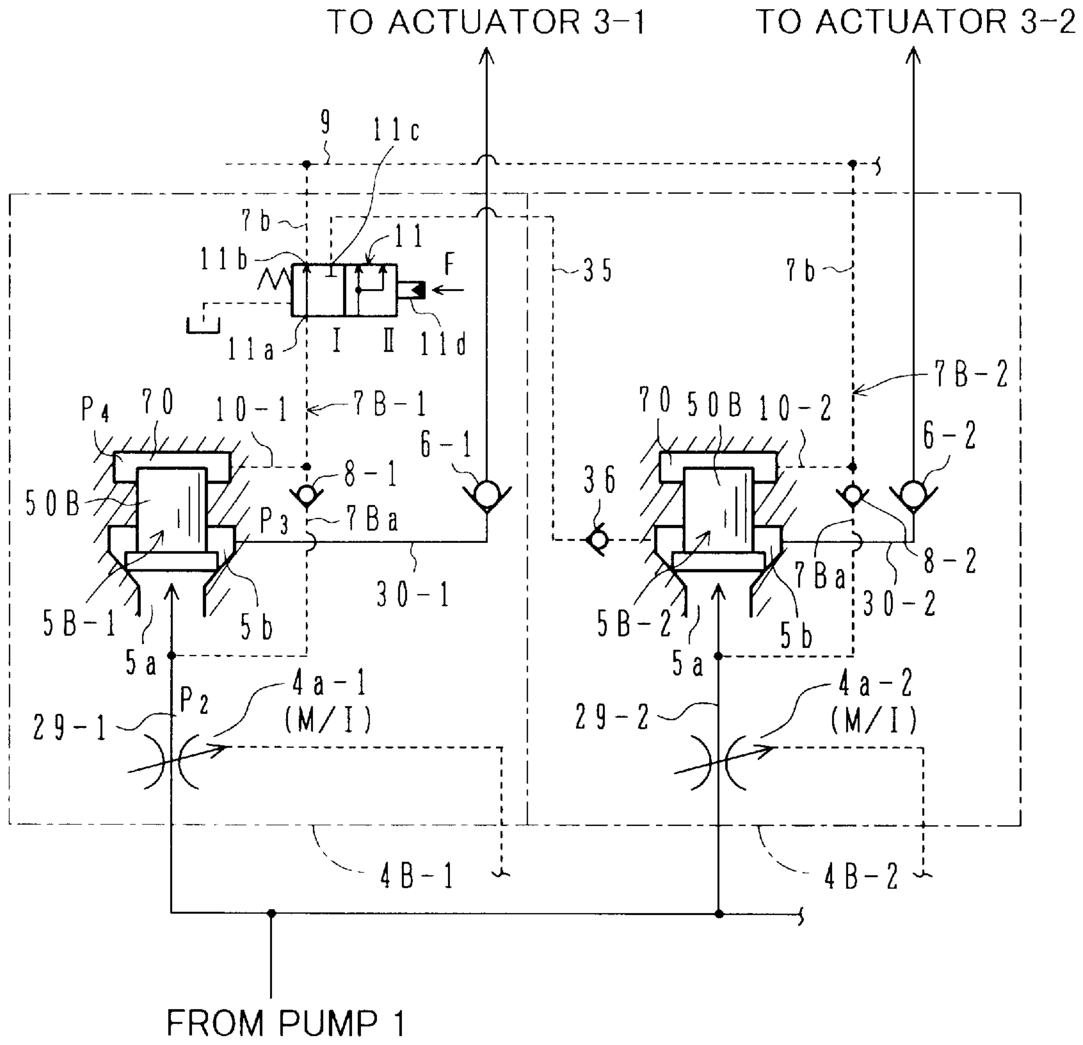
FIG. 8 is a diagram showing an equivalent circuit for explaining a function of a control valve shown in FIG. 7.

A third embodiment of the present invention will be described with reference to FIGS. 7 and 8. In this embodiment, the load pressure is detected at a different position. In FIGS. 7 and 8, identical members to those in FIGS. 1 and 4 are denoted by the same numerals.

Referring to FIG. 7, a control valve 4B-1 in the third embodiment of the present invention includes a flow distribution valve 5B-1. A valve body 50B of the flow distribution valve 5B-1 has an internal passage 20B which is formed therein and opened at one end to an inlet passage 5*a*. An opposite end portion 20*a* of the internal passage 20B is opened to an outer peripheral surface of the valve body 50B so that, when the valve body 50B is in the closed position as shown, a lap portion 32 having a lap amount X is formed between the open end portion 20*a* of the internal passage 20B and the control chamber 70 to cut off communication therebetween. When the valve body 50B is moved through its stroke from the shown closed position in excess of the lap amount X, the internal passage 20B is opened to the control chamber 70. Also in this case, the internal passage 20B and the lap portion 32 constitute a first hydraulic line with a check valve function, which is branched from a point between the meter-in variable throttle M/I and the hydraulic actuator 3-1 and detects a pressure at the branched point, and which is connected to the control chamber 70 of the flow distribution valve 5B-1. In this embodiment including the hold check valves 6-1 and 6-2, the first hydraulic line with the check valve function (i.e., the hydraulic line slit 20 and the lap portion 32) is branched from a point between the meter-in variable throttle M/I and the hold check valve 6-1, more precisely, between the meter-in variable throttle M/I and the flow distribution valve 5-1, and detects a pressure at the branched point. As with the first embodiment, the 2position, 3-way valve 11, which is a feature of the present invention, is disposed in the hydraulic line 31-1.

A flow distribution valve 5B-2 on the side of the control valve 4B-2 shown in FIG. 7 is constructed similarly to the above-described flow distribution valve 5B-1. However, a 2-position, 3-way valve is not disposed in a hydraulic line 31-2. In addition, as with the first embodiment, a lower-pressure detecting hydraulic line 35 is connected, as a third hydraulic line, to an outlet passage 5*b* of the flow distribution valve 5B-2 and a check valve 36 is disposed in the lower-pressure detecting hydraulic line 35.

FIG. 8 is an equivalent circuit, similar to that of FIG. 4, for explaining the load-pressure detecting function of the control valves 4B-1, 4B-2.

In FIG. 8, a load-pressure detecting hydraulic line 7B-1 is branched from a hydraulic line 29-1 between the meter-in variable throttle M/I of the main valve 4*a*-1 in the control valve 4B-1 and the inlet passage 5*a* of the flow distribution valve 5B-1, and is connected to the signal transmitting hydraulic line 9. Also, a control hydraulic line 10-1 is branched from the load-pressure detecting hydraulic line 7B-1 and connected to the control chamber 70. A check valve 8-1 allowing the hydraulic fluid to flow only in a direction toward the signal transmitting hydraulic line 9 from the hydraulic line 29-1 is provided in a hydraulic line portion 7B of the load-pressure detecting hydraulic line 7B-1 on the inlet side thereof. The 2-position, 3-way valve 11 is disposed in a hydraulic line portion 7*b* of the load-pressure detecting hydraulic line 7B-1 between a branched point to the control hydraulic line 10-1 and the signal transmitting hydraulic line 9.

In the control valve 4B-1 shown in FIG. 7, the internal passage 20B corresponds to the hydraulic line portion 7B of the load-pressure detecting hydraulic line 7B-1, the hydraulic line 31-1 corresponds to the hydraulic line portion 7*b* of the load-pressure detecting hydraulic line 7B-1, and the lap portion 32 corresponds to the check valve 8-1 and the control hydraulic line 10-1. Thus, in the case of the 2-position, 3-way valve 11 being in the position I, when the load pressure of the associated hydraulic actuator 3-1 is a maximum one, that load pressure is introduced to the control chamber 70 from a portion between the meter-in variable throttle M/I and the flow distribution valve 5B-1 through the internal passage 20B (the hydraulic line portion 7B in FIG. 8). The pressure introduced to the control chamber 70 is further introduced to the signal transmitting hydraulic line 9 through the hydraulic line 31-1 (the hydraulic line portion 7*b* in FIG. 8).

In the case of the 2-position, 3-way valve 11 being in the position I, during the sole operation or when the load pressure of the associated hydraulic actuator is a maximum one during the combined operation, the flow distribution valve 5B-1 or 5B-2 is in the fully open state, and hence the pressure in the inlet passage 5*a* of the flow distribution valve 5B-1 or 5B-2 is almost equal to the pressure in the outlet passage 5*b*. Accordingly, the load pressure can be detected by the internal passage 20B similarly to the first embodiment using the hydraulic line slit 20.

The load-pressure detecting function on the side of the control valve 4B-2 is essentially the same as that of the control valve 4B-1 except for that a 2-position, 3-way valve is not provided.

In the control valves 4B-1, 4B-2 of this embodiment, as described above, the load-pressure detecting hydraulic lines each provided with the check valve function are incorporated as respective internal passages of the flow distribution valves 5B-1, 5B-2.

Therefore, this embodiment can also provide similar advantages to those in the first embodiment.

Figure 9:
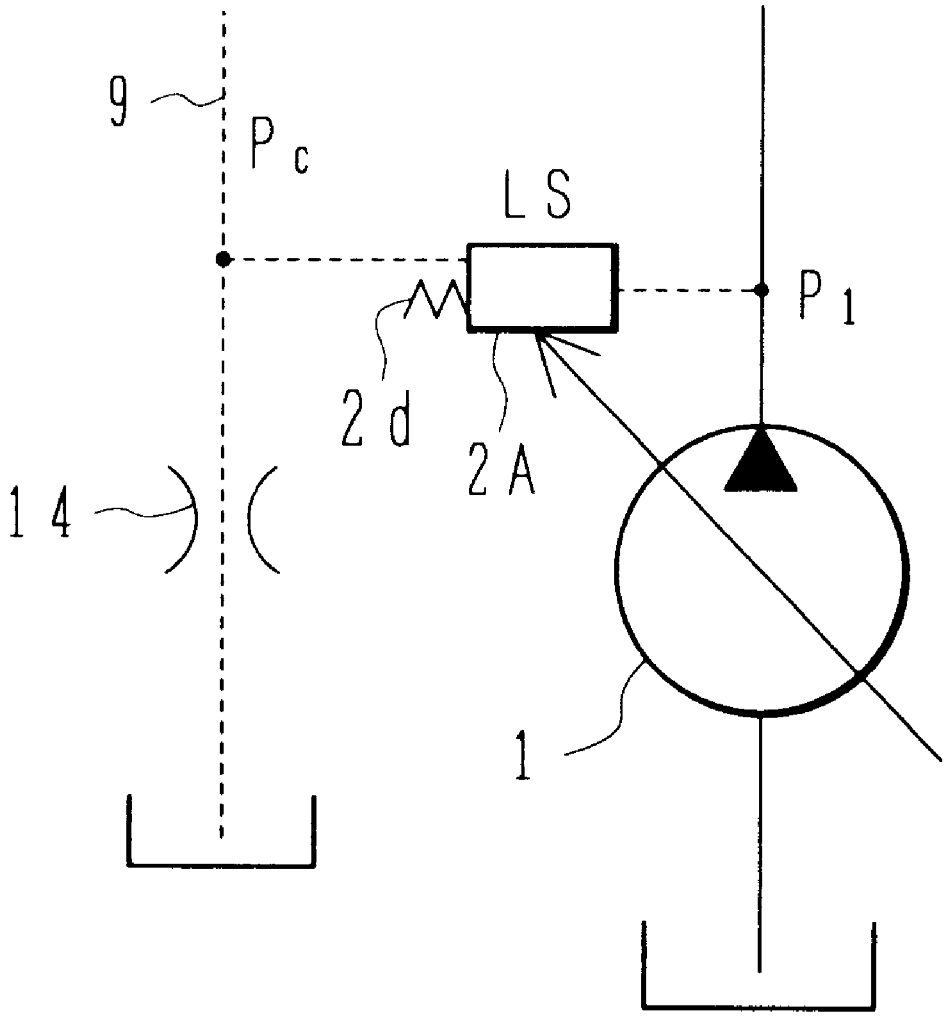
FIG. 9 shows another example of pump control means of a load sensing system.

While several embodiments of the present invention have been described above, those embodiments can be modified in various manners within the scope of the spirit of the present invention. For example, in the above embodiments, the bleed valve 2 is employed as the pump control means for the load sensing system. As shown in FIG. 9, however, a tilting controller 2A may be used to perform tilting control of a hydraulic pump 11A so that the delivery pressure P1 of the hydraulic pump 1 is kept higher than the signal pressure Pc of the signal transmitting hydraulic line 9 by the setting value ΔPL of the spring 2*d*. Similar advantages to those described above can also be obtained in the case where the present invention is applied to a hydraulic circuit system having such a load sensing system.

Industrial Applicability

According to the present invention, during a combined operation including driving of an inertial body, a pressure on the lower load pressure side is detected as a signal pressure. In the combined operation of swing and boom-raising, for example, which is performed in the work of loading excavated earth and sand on a dump truck, it is therefore possible to prevent an extra pressure loss from being produced in a flow distribution valve portion of a second particular control valve, and to reduce an energy loss. Further, a hydraulic fluid can be supplied to the side of the second particular control valve at a sufficient flow rate and good operability can be obtained in the combined operation.

Also, since a load-pressure detecting hydraulic line of each control valve is formed as an internal passage (hydraulic line slit) of a flow distribution valve and the internal passage (hydraulic line slit) is utilized to provide a check valve function, a load-pressure detecting function of the control valve can be realized with a simplified structure.

Moreover, the same function as resulted from not detecting a pressure on the side of a first particular control valve is provided by, rather than cutting off a hydraulic line, connecting a control chamber to both a signal transmitting hydraulic line and a lower-pressure detecting hydraulic line (outlet side of the flow distribution valve in the second particular control valve). Therefore, a function of introducing a pressure on the side of the second particular control valve to the control chamber is maintained and the flow distributing function is not impaired.

In addition, according to the present invention, when load pressures are reversed in magnitude during the combined operation such that the second particular control valve becomes the side providing a higher load pressure, the higher load pressure is detected as a signal pressure by the signal transmitting hydraulic line. As a result, a hydraulic actuator on the side of the second particular control valve can be positively driven.

Further, according to the present invention, a first hydraulic line is branched from a hydraulic line between the flow distribution valve and a hold check valve and detects a pressure in the hydraulic line therebetween as a load pressure. Therefore, even when the load pressure of a hydraulic actuator is increased beyond the pressure at a meter-in variable throttle M/I of a main valve, the load pressure is held by the hold check valve and the hydraulic fluid is avoided from reversely flowing into a reservoir via the first hydraulic line, a second hydraulic line, a signal transmitting hydraulic line and a first throttle.

Additionally, according to the present invention, when the hydraulic actuator on the side of the second particular control valve reaches its stroke end, a pilot check valve is opened so that the signal pressure in the signal transmitting hydraulic line is given by the pressure on the side of the first particular control valve. This feature contributes to providing a more appropriate working speed and reducing an energy loss.

What is claimed is:

1. A hydraulic circuit system comprising a hydraulic pump (1), a plurality of hydraulic actuators (3-1, 3-2) driven by a hydraulic fluid delivered from said hydraulic pump, a plurality of control valves (4-1, 4-2) disposed between said hydraulic pump and said plurality of actuators, a signal transmitting hydraulic line (9) to which a signal pressure based on a maximum load pressure among said plurality of hydraulic actuators is introduced, and pump control means (2) for controlling a delivery pressure of said hydraulic pump to be held higher than said signal pressure by a predetermined value, said plurality of control valves comprising respectively main valves (4*a*-1, 4*a*-2) including meter-in variable throttles (M/I) for controlling flow rates of the hydraulic fluid supplied to said hydraulic actuators, and flow distribution valves (5-1, 5-2) disposed between a third hydraulic line (35) connected to the outlet side (5*b*) of said flow distribution valve in a second particular control valve (4-2) of said plurality of control valves, said selector valve (11) having a first position (I) at which a portion of said second hydraulic line (31-1) on the side of said control chamber is connected to only said signal transmitting hydraulic line (9), and a second position (II) at which the portion of said second hydraulic line (31-1) on the side of said control chamber is connected to both said signal transmitting hydraulic line (9) and said third hydraulic line (35).

2. A hydraulic circuit system comprising a hydraulic pump (1), a plurality of hydraulic actuators (3-1, 3-2) driven by a hydraulic fluid delivered from said hydraulic pump, a plurality of control valves (4-1, 4-2) disposed between said hydraulic pump and said plurality of actuators, a signal transmitting hydraulic line (9) to which a signal pressure based on a maximum load pressure among said plurality of hydraulic actuators is introduced, and pump control means (2) for controlling a delivery pressure of said hydraulic pump to be held higher than said signal pressure by a predetermined value, said plurality of control valves comprising respectively main valves (4*a*-1, 4*a*-2) including meter-in variable throttles (M/I) for controlling flow rates of the hydraulic fluid supplied to said hydraulic actuators, and flow distribution valves (5-1, 5-2) disposed between said meter-in variable throttles and said actuators, each of said flow distribution valves including a valve body (50) which has one end positioned on the inlet side (5*a*) of said flow distribution valve connected to said meter-in variable throttle and the other end positioned in a control chamber (70), said valve body being moved through a stroke depending on balance between a pressure in said control chamber and a pressure in said inlet side to control the pressure in said inlet side, thereby controlling a differential pressure across said meter-in variable throttle, wherein:

said hydraulic circuit system further comprises a load-pressure detecting hydraulic line (20, 32, 31-1, 31-2; 7*a*, 8-1, 8-2, 10-1, 10-2, 7*b*) provided in each of said plurality of control valves (4-1, 4-2), said load-pressure detecting hydraulic line including a first hydraulic line (20, 32; 7*a*, 8-1, 8-2, 10-1, 10-2) with a check valve function, which is branched from a point between said meter-in variable throttle (M/I) and said hydraulic actuator (3-1, 3-2) for detecting a pressure at the branched point, and is connected to said control chamber (70) of said flow distribution valve (5-1, 5-2), and a second hydraulic line (31-1, 31-2, 7*b*) for connecting said control chamber to said signal transmitting hydraulic line (9), said first hydraulic line with the check valve function including a valve body passage (20), which is formed in a valve body (50) of said flow distribution valve (5-1, 5-2) and has one end being opened to one of the inlet side (5*a*) and the outlet side (5*b*) of said flow distribution valve and the other end being opened to an outer periphery of said valve body, and a lap portion (32) located between the other end (20*a*) of said valve body passage and said control chamber (70) and making the other end of said valve body passage opened to said control chamber when the valve body of said flow distribution valve is moved through a stroke of a predetermined distance in the valve opening direction;

a selector valve (11) provided in said second hydraulic line (31-1) of said load-pressure detecting hydraulic line in a first particular control valve (4-1) of said plurality of control valves; and a third hydraulic line (35) connected to the outlet side (5*b*) of said flow distribution valve in a second particular control valve (4-2) of said plurality of control valves, said selector valve (11) having a first position (I) at which a portion of said second hydraulic line (31-1) on the side of said control chamber is connected to only said signal transmitting hydraulic line (9), and a second position (II) at which the portion of said second hydraulic line (31-1) on the side of said control chamber is connected to both said signal transmitting hydraulic line (9) and said third hydraulic line (35).

3. A hydraulic circuit system according to claim 2, wherein said plurality of control valves (4-1, 4-2) further comprise respectively hold check valves (6-1, 6-2) disposed between said flow distribution valves (5-1, 5-2) and said hydraulic actuators (3-1, 3-2), and said first hydraulic line (20, 32; 7*a*, 8-1, 8-2, 10-1, 10-2) with the check valve function is branched from a point between said meter-in variable throttle (M/I) and each of said hold check valves (6-1, 6-2) to detect a pressure at the branched point.

4. A hydraulic circuit system according to claim 2, wherein said plurality of control valves (4-1, 4-2) each include a hydraulic line slit (20) formed in the outer periphery of the valve body (50) of said flow distribution valve and opened at one end to the outlet side (5*b*) of said flow distribution valve, said hydraulic line slit constituting said valve body passage.

5. A hydraulic Circuit system according to claim 2, further comprising means (42) for producing a first signal (F) when said first and second particular control valves (4-1, 4-2) are bath operated, wherein said selector valve (11) is shifted from said first position to said second position by said first signal.

6. A hydraulic circuit system according to claim 2, further comprising a check valve (36) disposed in said third hydraulic line (35) and allowing the hydraulic fluid to flow only in a direction toward said flow distribution valve (5-2) of said second particular control valve (4-2) from said selector valve (11).

7. A hydraulic circuit system according to claim 6, wherein said check valve is a pilot check valve (36A) capable of being selectively opened.

8. A hydraulic circuit system according to claim 7, further comprising means (85, 86, 87) for producing a second signal (Z) when said hydraulic actuator (3-2) associated with said second particular control valve (4-2) reaches a stroke end, wherein said pilot check (36A) valve is opened by said second signal.

* * * * *